(12) United States Patent
Wolter (10) Patent No.: US 8,150,962 B1
(45) Date of Patent: Apr. 3, 2012

(54) METHOD AND SYSTEM FOR DELIVERY OF USER-INTERFACE SKINS, APPLICATIONS AND SERVICES FOR WIRELESS DEVICES

(75) Inventor: Eric S. Wolter, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 672 days.

(21) Appl. No.: 11/333,964

(22) Filed: Jan. 17, 2006

Related U.S. Application Data (63) Continuation-in-part of application No. 11/046,083, filed on Jan. 28, 2005, now abandoned.

(51) Int. Cl.
G06F 15/173 (2006.01)

(52) U.S. Cl. ...................................... 709/224

(58) Field of Classification Search .......... 709/203–207, 709/224; 715/523–525, 700, 716, 726, 730, 715/744, 746
See application file for complete search history.

(56) References Cited

U.S. PATENT DOCUMENTS

| | | | | |
|---|---|---|---|---|
| 6,091,411 A * | 7/2000 | Straub et al. | .................. | 715/747 |
| 6,356,838 B1 * | 3/2002 | Paul | .................. | 701/209 |
| 6,650,889 B1 * | 11/2003 | Evans et al. | .................. | 455/412.1 |
| 7,093,198 B1 * | 8/2006 | Paatero et al. | .................. | 715/746 |
| 7,363,035 B2 * | 4/2008 | Reilly | .................. | 455/432.3 |
| 7,665,105 B2 * | 2/2010 | Evans | .................. | 725/32 |
| 2002/0078291 A1 * | 6/2002 | Sutton et al. | .................. | 710/302 |
| 2002/0167542 A1 * | 11/2002 | Florin | .................. | 345/745 |
| 2003/0208754 A1 * | 11/2003 | Sridhar et al. | .................. | 725/34 |
| 2004/0024639 A1 * | 2/2004 | Goldman | .................. | 705/14 |
| 2004/0098449 A1 * | 5/2004 | Bar-Lavi et al. | .................. | 709/202 |
| 2004/0201603 A1 * | 10/2004 | Kalish | .................. | 345/700 |
| 2005/0085272 A1 * | 4/2005 | Anderson et al. | .................. | 455/566 |
| 2006/0041906 A1 * | 2/2006 | Vermola | .................. | 725/39 |
| 2006/0148522 A1 * | 7/2006 | Chipchase et al. | .................. | 455/557 |
| 2007/0067738 A1 * | 3/2007 | Flynt et al. | .................. | 715/810 |

OTHER PUBLICATIONS

Lecture Slides: "Mapping User Interface Design to Culture Dimensions", Samuel K. Ackerman (Jul. 13, 2002).
Stanford Technology Ventures Program, "Danger, Inc. Powering the Next Generation of Mobile Technology", STVP-2003-002 (Oct. 15, 2003).
Qualcomm uiOne™ product overview (circa 2005) 5 pages.
Press Release: "ScanSoft Launches SpeechPAK Healthcare Suite 2.0" (Feb. 21, 2005).

* cited by examiner

*Primary Examiner* — Asad Nawaz
*Assistant Examiner* — Sargon Nano (57) ABSTRACT

Wireless devices such as cell phones and personal digital assistants are automatically provisioned with a user interface skin, application logic, and/or wireless communications services based on demographics data acquired from the subscriber/user of the device. A computing system that implements the provisioning features acquires the demographics data and categorizes the subscriber/user into one of a predetermined demographics type or category, e.g., Baby Boomer, Teenager, Female-led family, Retiree, etc. Such demographic categories may also include business professions, e.g., Health Professional, Claims Adjuster, Attorney, Stock Broker, Real Estate Broker, etc. Such provisioning with a user interface skin, application logic, and/or services may occur initially, e.g., at the time of sale, and/or may occur later on as the subscriber demographics change and such changes are recorded in a subscriber profile database.

12 Claims, 7 Drawing Sheets

METHOD AND SYSTEM FOR DELIVERY OF USER-INTERFACE SKINS, APPLICATIONS AND SERVICES FOR WIRELESS DEVICES

CROSS-REFERENCE TO RELATED APPLICATION

This is a continuation-in-part of application Ser. No. 11/046,083 filed Jan. 28, 2005, pending, the contents of which are incorporated by reference herein. Priority benefit to the '083 application is hereby claimed pursuant to 35 U.S.C. §120.

FIELD OF THE INVENTION

The present invention relates to telecommunications and, more particularly, to provisioning of wireless communication devices such as cell phones with user interface skins, applications and services.

BACKGROUND

The user interface has become a significant element of many telecommunication devices, ranging from desktop personal computers to handheld cell phones and personal digital assistants. In early days, the user interface on most devices was monochrome and rudimentary, often limited to simple text display and basic tone output. With advances in both processing power and display and sound driver technology, the user interface has grown to be far more interesting and diverse. Most user interfaces today include full-color high-resolution displays and robust audio output, suitable for presenting images and sounds of all sorts.

One recent trend in user interface technology has been the advent of user interface "skins." As the name suggests, a user interface "skin" is a format or dressing applied to the core functions of a user interface. Various skins can be provided to a single hardware device by means of loading the device with settings and program code that affect the way the device appears and is used, as will be explained below.

The core functions of a user interface may include elements such as (i) graphical buttons and pull-down menus that a user can select, so as to invoke various device functions, (ii) information-display areas for presenting text, graphics, and other types of information, (iii) borders and visual casings or windows for containing various display elements, (iv) scroll bars that a user can employ to scroll through displayed information, (v) cursors, such as arrows, for pointing to and highlighting buttons or displayed information, and (vi) audio outputs to alert a user of various device states or events. Further, specialized devices or user interfaces may have any of a variety of specialized user interface functions.

A user interface skin typically enhances these or other user interface functions by dressing the functions in thematic graphics and/or sounds. By way of example, a user interface skin may provide (i) special graphics to be displayed as selectable buttons or menus, (ii) special graphics, such as texture-graphics or photographic images, to be displayed as backgrounds, foregrounds, borders, casings, and/or other aspects of the user interface, (iii) cursor graphics, (iv) color schemes, such as border colors, text colors, and button colors, (v) special fonts for displayed text, (vi) and special sounds, such as music or tones to be provided as audio output. Further, a user interface skin can define the arrangement of user interface components, such as the relative positioning of button graphics, menus, informational display sections, and the like, as well as associations between particular sounds and device states and events.

User interface skins can be applied to user interfaces of particular program applications that run on a device or a user interface of the device generally (e.g., to a core device-management application). For example, a particular application may run in its own display window of the device (regardless of whether the window is maximized to fit the entire display screen) and may define its own set of user interface functions. A skin can be applied to such a user interface, in order to enhance visual and/or audible elements of the user interface. As another example, a device may have a core device-management application, such as an operating system application, that supports execution of other applications or implementation of various device functions. Like more specific program applications, the core device-management application may itself define a user interface including user interface functions such as those described above. And a skin can be similarly applied to such a user interface to enhance various elements of the user interface.

A given user interface can have a permanent skin that is hard coded as an integral aspect of the user interface at the time of application-design or device-manufacture. Alternatively, a user interface can be arranged to have any of a variety of skins selected by a user. By way of example, a device or application may come pre-set with a number of skins that a user can select to apply to the user interface. Through an "options" menu, for instance, the user may select a desired skin, and the device or application may apply that skin to the user interface. As another example, a user may visit a website to acquire a new skin for a given user interface and may then direct the device or application to apply that new skin to the user interface.

User interface skins can be encoded and applied to user interfaces in any of a variety of ways. Some skins may be encoded in a way that uniquely relates to a particular user interface, such as in the form of executable code that sets attributes of specific user interface objects (possibly unique to a particular application). Other skins may be defined in a more open manner, such as with an extensible markup language (XML) script or as a skin object that can be interpreted and applied by a user-interface skin-interpretation program.

An example of user interface skins are those provided by Qualcomm Inc., of San Diego, Calif. (formerly by Trigenix Limited, of Cambridge, UK), for use on wireless handheld devices such as cell phones and personal digital assistants. Qualcomm encodes user interface skins (or skin updates) with industry standard XML, to define precise positioning and appearance of user interface elements on the relatively small display screens of wireless handheld devices. Qualcomm provides a skin development application called Trigbuilder™, which allows building, testing and debugging of XML-based skins or skin updates called "Trigs" or "Triglets". Qualcomm then provides an application called Trigplayer™, which runs on a wireless handset and is arranged to receive and render a Trig or Triglet defining a particular skin or skin update and to apply the skin or skin update to the user interface of the handset. Further, Qualcomm provides a Trigserver™ application that runs on a network server and manages Trigs and Triglets to facilitate transmission of the Trigs and Triglets over the air to wireless handsets.

SUMMARY

The following embodiments and aspects thereof are described and illustrated in conjunction with systems, tools and methods which are meant to be exemplary and illustrative, not limiting in scope.

In a first aspect, this disclosure provides for a method of provisioning a user interface of a wireless communications device, such as a cellular telephone, personal digital assistant or other. The provisioning is performed in an automated manner that is based on a demographic category that the subscriber is assigned to using demographic data associated with the subscriber. An advantage provided by the method is that the user does not have to take the time to manually configure their user interface to provide the look, applications and features they would be expected to want. The configuration is basically automatic once the demographic data is provided.

The method includes a step (a) of acquiring demographic data from a subscriber using the wireless communications device. Such demographic data may be acquired at the time of sale, e.g., demographic information is obtained from the customer and entered into a computer at a sales outlet, and such data is then sent to a provisioning system (workstation or server, described below) managed by a wireless service provider. Such demographic data may include items such as the age, sex, occupation, marital status, and hobbies or interests of the subscriber, and of course other types of data.

The method includes a further step of (b) classifying the subscriber into a demographic category based on the acquired demographic data. Preferably, the service provider has previously established a number of different demographic segments or categories, such as Connected Youth, Single Mom, Babyboomer, Young Professional, etc. The service provider (or more particularly the service provider workstation or server) executes a classification algorithm that assigns the subscriber to one of the categories based on the demographic data, such as the age, sex or occupation of the subscriber.

The method further continues with step (c) of provisioning the device with a graphic user interface (skin) associated with the demographic category. For example, if the subscriber is classified as a Connected Youth (or Teenager or whatever similar label is applied to this demographics category), a set of one or more files comprising GUI instructions or settings are supplied to the device, e.g., in an initialization procedure, which configures the device to have a particular user interface skin attractive to young people. The features of the skin could include features like special graphics to be displayed as selectable buttons or menus, (ii) special graphics, such as texture-graphics or photographic images, to be displayed as backgrounds, foregrounds, borders, casings, and/or other aspects of the user interface, (iii) cursor graphics, (iv) color schemes, such as border colors, text colors, and button colors, (v) special fonts for displayed text, (vi) and special sounds, such as music or tones to be provided as audio output. Further, as noted above, the user interface skin can define the arrangement of user interface components, such as the relative positioning of button graphics, menus, informational display sections, and the like, as well as associations between particular sounds and device states and events.

In one variation of this invention, the provisioning step c) may take the form of provisioning the device with applications and/or services that the device can use, such as email service, interne web browsing, stock quotes, picture storage, etc. Such applications or services could be bundled together, e.g., for a Connected Youth the subscriber gets skin X, applications A, B, C and D, and Services G, H and I.

In one embodiment, the method further comprises the steps of creating a profile for the subscriber, including the demographic category of the subscriber in the profile, and linking the subscriber profile to one or more services provided to the subscriber based on the demographic category. For example, the profile may contain a link or pointer to a memory location where services (or logic for execution of services) that are to be provided for the subscriber based on their demographic segment. Such services may be bundled together as a package of services. The wireless service provider typically will bundle together services that are particularly appropriate or in demand by users in each particular demographic segment.

In one possible embodiment, the categories or segments include categories for different business professions, such as Stock Broker, Health Care Professional, Banker, Lawyer, etc. Each profession category is further associated with a bundle of applications and/or services for the device. For example, Stock Broker category could include applications which are specific to financial matters, obtaining stock quotes over the internet, an email application, an SMS application, and a calendar application. Furthermore, in this aspect the method further comprises the step of provisioning the device with the bundle of applications and/or logic for implementing the bundle of services that is pertinent to the business profession category that is assigned to the subscriber. Such provisioning could occur via a download to the device, e.g., during an initial provisioning of the device.

As noted above, the provisioning of the device with a user interface skin, applications or services may be performed at the time the device is acquired and service established. In still further embodiments, the provisioning of a new user interface skin, downloading of new applications, or providing new services based on a demographic category can be performed long after service is initiated. For example, a use may access their demographic profile via a web interface and change their demographic data, e.g., to reflect a change in careers, to reflect a change in their age or a new lifestyle, etc. When such changes are made, the provisioning system can then re-classifying the subscriber into a new demographic category. Furthermore, the provisioning system may re-provisioning the device with a new user interface skin, and/or applications or services based on the new demographic category that was assigned.

In still another aspect, a system is disclosed for provisioning a wireless communications device with at least one of (a) a user interface skin, (b) application logic, and (c) wireless communication services. The system may take the form of a computing platform such as a network server having a machine-readable memory and a processor for executing instructions stored in the memory. The instructions including instructions for:

(a) acquiring demographic data from a subscriber using the wireless communications device;

(b) classifying the subscriber into a demographic category based on the demographic data;

(c) selecting at least one of 1) a user interface skin, 2) a set of application logic, 3) and one or more services for the subscriber for use with the device based on the demographic category, and (d) providing the selected user interface skin, set of application logic and/or logic for enabling use of the service(s) to the device.

In addition to the exemplary aspects and embodiments described above, further aspects and embodiments will become apparent by reference to the drawings and by study of the following detailed descriptions.

BRIEF DESCRIPTION OF THE DRAWINGS

FIG. 6 is an illustration of a subscriber making a purchase of a wireless communications device. Demographic data is obtained from the subscriber at the time of purchase and used by a network server to provision the device based on a demographic category or segment that the user is assigned to.

DETAILED DESCRIPTION OF AN EXEMPLARY EMBODIMENT

Figure 1:
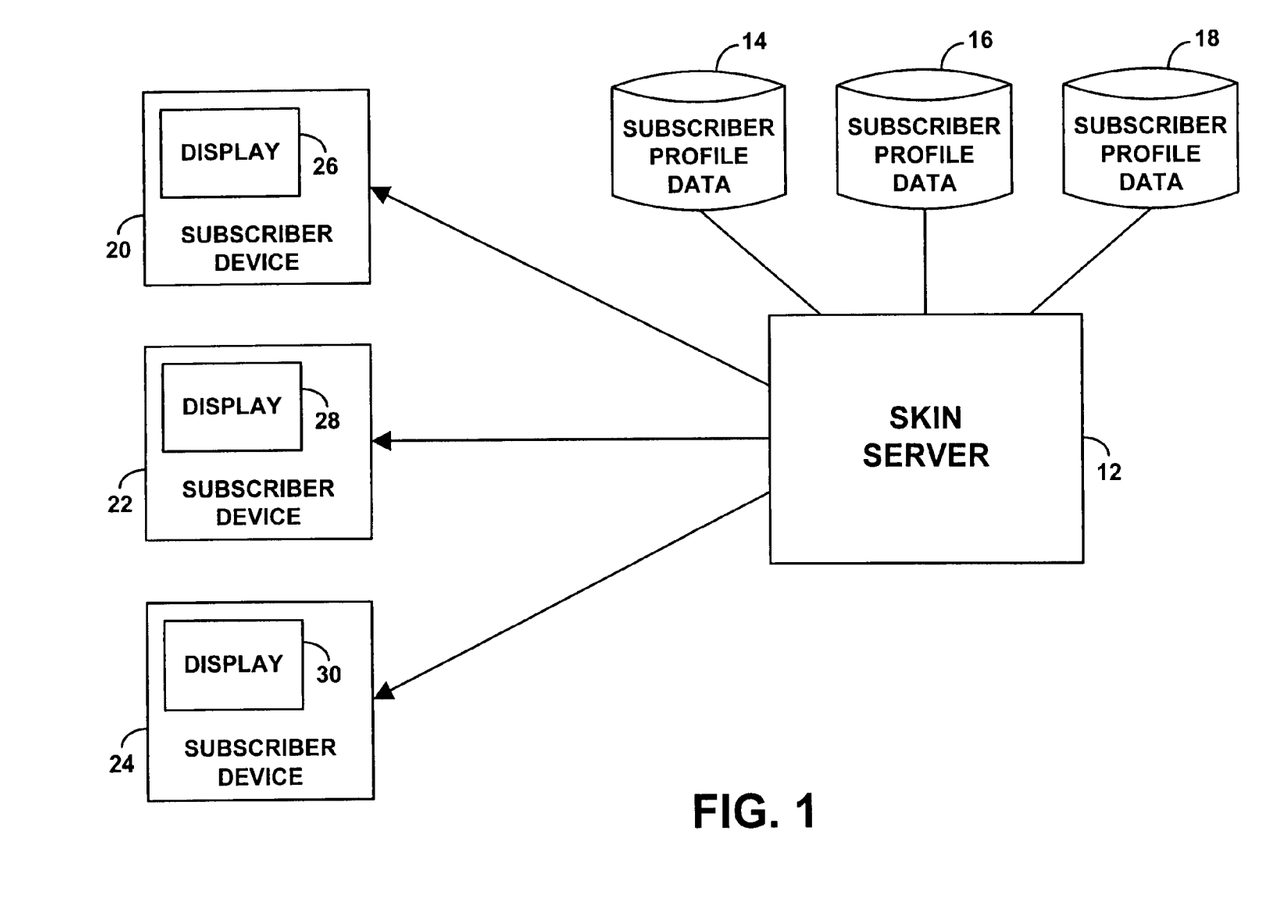
FIG. 1 is a simplified block diagram of a system in which an exemplary embodiment of the invention can be employed.

Referring to the drawings, FIG. 1 is a simplified block diagram illustrating a system for delivering user interface skins to wireless devices, and providing updates to user interface skins. As shown, the system includes a skin server 12, which includes or has access to various sets of data including subscriber profile data 14, calendar data 16, and skin data 18. The system further includes a plurality of subscriber devices, represented by exemplary devices 20, 22, 24. Each subscriber device 20, 22, 24 then includes a user interface comprising a display screen 26, 28, 30.

This disclosure includes a description of a calendar-based skin delivery service whereby the skins on subscriber devices are updated. This feature will be described first. Briefly, in this aspect, a system will deliver themed user interface updates to subscriber devices when particular calendar events occur. By way of example, when Christmas occurs, the system may automatically deliver to subscriber devices a Christmas-themed user-interface skin. As another example, every week, the system may automatically deliver to subscriber devices a user-interface skin that has attributes themed to reflect the artist or song at the top of the pop charts.

Later on, this disclosure will describe a method and system for demographics-based customization of the skins, applications and services at the time of initial purchase of the device or later on.

Calendar-Based Skin Delivery Service

With continued reference to FIG. 1, subscriber profile data 14 contains data that indicates (i) which subscribers subscribe to a calendar-based skin delivery service and (ii) for each subscriber to the service, one or more preferred skin themes. This data can be arranged in various ways. By way of example, the subscriber profile data 14 data can include an individual database record respectively for each subscriber to the service. Each subscriber's record can be keyed to a unique subscriber-identifier (such as a device identifier for instance), and each subscriber's record can include fields that specify one or more theme categories, such as government holidays, religious holidays, personal holidays, pop-music, seasonal, and so forth. Further, certain specified theme categories can include additional attributes. For instance, the religious holidays can specify which religion, and the personal holidays can specify holiday type (e.g., birthday, anniversary, graduation, etc.) as well as associated date of celebration.

As another example, instead of (or in addition to) segregating the subscriber profile data 14 by subscriber, the data can be segregated by theme-categories and can specify, for each theme category, which subscribers currently subscribe to receive calendar-based user interface skin updates for that theme. For instance, for each theme-category, the data may include a listing of subscribers (by subscriber identifier). A given subscriber can subscribe to receive skin updates falling within multiple theme-categories, and so the subscriber might be listed under more than one theme-category in the subscriber profile data 14.

Calendar data 16 contains data that generally defines various periodic calendar events. By way of example, calendar data 16 may include a listing of government holidays (e.g., federal, state, and local holidays), religious holidays (e.g., per religion), seasons, and so forth, together with an indication, for each event, of a date on which the event occurs. Where periodic events recur on a particular day or date in the Gregorian calendar, the calendar data 16 may specify that day or date generally or relatively (e.g., "the third Thursday of November") without regard to year. Where periodic events occur on a different date each year under the Gregorian calendar, the calendar data 16 may specify the dates of occurrence of the events specifically for each year.

Skin data 18 contains data that defines various skins and that correlates each skin with a particular user interface theme-category. In a preferred embodiment, each skin will be defined by an XML script, such as in the form provided by Qualcomm and created with the Trigbuilder™ application for instance. The various skins may be stored as respective files each having a respective file name, and skin data 18 may include a table that correlates the various file names with particular theme-categories. By way of example, the skin data 18 may correlate (i) a Christmas themed skin with the theme "Christmas," (ii) a birthday themed skin with the theme "Birthday", (iii) a pop-music themed skin with the theme "Music," (iv) a winter themed skin with the theme "Winter," and so forth.

These skins can be created by artists and skin-designers and then stored for use. Certain skins may not generally change with time and may thus be created and stored for use on an as-needed basis. Seasonal or holiday skins may fall within this category (although they may also be updated over time). Other skins may change more regularly with time and may be updated regularly. Pop-music themed skins, for instance, may be changed each time a new top musical artist or song is named in the charts, so that a current pop-music themed skin will have attributes related to the current top artist and/or song. The specific artistic design of skins in skin data 18 is of course a matter of design choice.

As noted above, server 12 may include or have access to the subscriber profile data 14, the calendar data 16, and the skin data 18. FIG. 1 depicts these data components as being located outside of skin server 12, possibly accessible to skin server 12 over a local network for instance. However, the data components could equally be located within server 12. Further, it should be understood that, although FIG. 1 depicts these three data components as discrete components, they could equally be integrated together, such as in a relational database format for instance.

Figure 2:
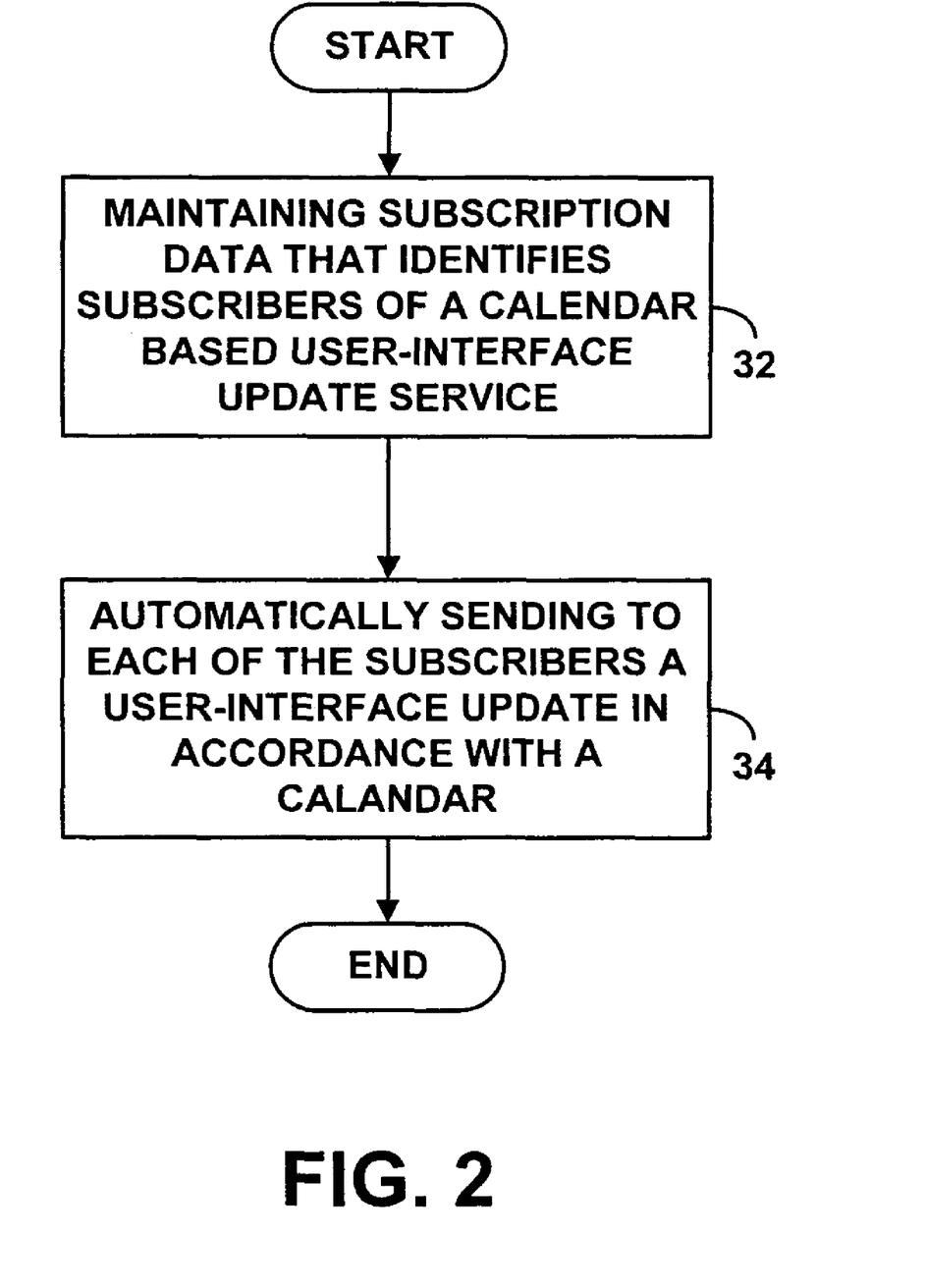
FIG. 2 is a flow chart depicting functions carried out in accordance with the exemplary 5, embodiment.

FIG. 2 is next a flow chart depicting how the exemplary embodiment can operate in the arrangement of FIG. 1. As shown in FIG. 2, at step 32, the method involves maintaining subscription data that identifies subscribers of a calendar based user-interface update service. This method step may be accomplished by maintaining subscriber profile data 14 as described above. Further, this subscriber profile data can be provisioned by an administrative entity (e.g., by a service provider) and/or by users (e.g., through an online provisioning interface). And the data may be updated at various times.

At step 34, the method next involves automatically sending to each of the subscribers a user-interface update in accordance with a calendar, where the user interface update defines one or more user interface attributes such as specifications for one or more colors, icons, sounds, fonts, button images, and/or background graphics.

This method step (together with the preceding method step) may be carried out with respect to those subscribers that are set to receive user interface updates within a particular theme-category, at the time an applicable calendar event occurs. By way of example, at the beginning of winter, the step may involve sending a winter-themed user-interface skin to all devices that subscribe to a season-themed user interface update service. As another example, when Christmas occurs or is about to occur, this step may involve sending a Christmas-themed user interface to all devices that subscribe to a holiday-themed user interface update service. As another example, on a weekly basis, this step may involve sending a pop-music themed user interface skin (e.g., reflecting the current top artist and/or song) to all devices that subscribe to a pop-music themed user interface update service.

To carry out method step 34, server 12 may thus first detect from calendar data 16 the occurrence of a particular calendar event that corresponds with a particular theme. The server 12 may then determine from subscriber profile data 14 which subscribers subscribe to a user interface skin update service for that theme, and the server may obtain the skin from skin data 18. The server 12 may then send the skin to each of the subscribers identified from subscriber profile data 14.

By way of example, assume that every Tuesday the server 12 is to deliver an updated pop-music skin to all subscribers of a pop-music themed user interface update service. In practice, when Tuesday occurs, the server 12 may detect from calendar data 16 (by comparison to a running calendar/clock) that today is a pop-music skin update day. The server 12 may then responsively search subscriber profile data 14 to identify all subscribers of the of the pop-music themed user interface update service, and the server may obtain the latest pop-music themed skin from skin data 18. The server 12 may then deliver the obtained pop-music themed skin to each of the identified subscribers, such as to subscriber devices 20, 22, 24 for instance.

As another example, assume that every Christmas Eve, the server 12 is to deliver a Christmas-themed skin to all devices that subscribe to a holiday themed user interface update service. In practice, when Christmas Eve occurs, the server 12 may detect from calendar data 16 that today is a holiday skin update day and that the holiday is Christmas. The server 12 may then responsively search subscriber profile data 14 to identify all subscribers of the holiday themed user interface update service, and the server may obtain a Christmas themed skin from skin data 18. The server 12 may then deliver the Christmas-themed skin to each of the identified subscribers.

As still another example, assume that, every day, server 12 is to deliver a personal holiday themed skin to all devices that subscribe to a personal-holiday themed user interface update service for that particular day. In practice, every day, the server can search subscriber profile data 14 for any and all subscribers for whom the profile data 14 lists a personal holiday on the current date, and the server may determine from each such record what the holiday is. For some such subscribers, the holiday may be a birthday, for instance. In that case, the server may then obtain the birthday-themed skin from skin data 18 and may deliver the birthday-themed skin to each subscriber. For other subscribers, the holiday may be an anniversary. In that case, the server may obtain the anniversary-themed skin from skin data 18 and may deliver the anniversary-themed skin to each subscriber.

Figure 3:
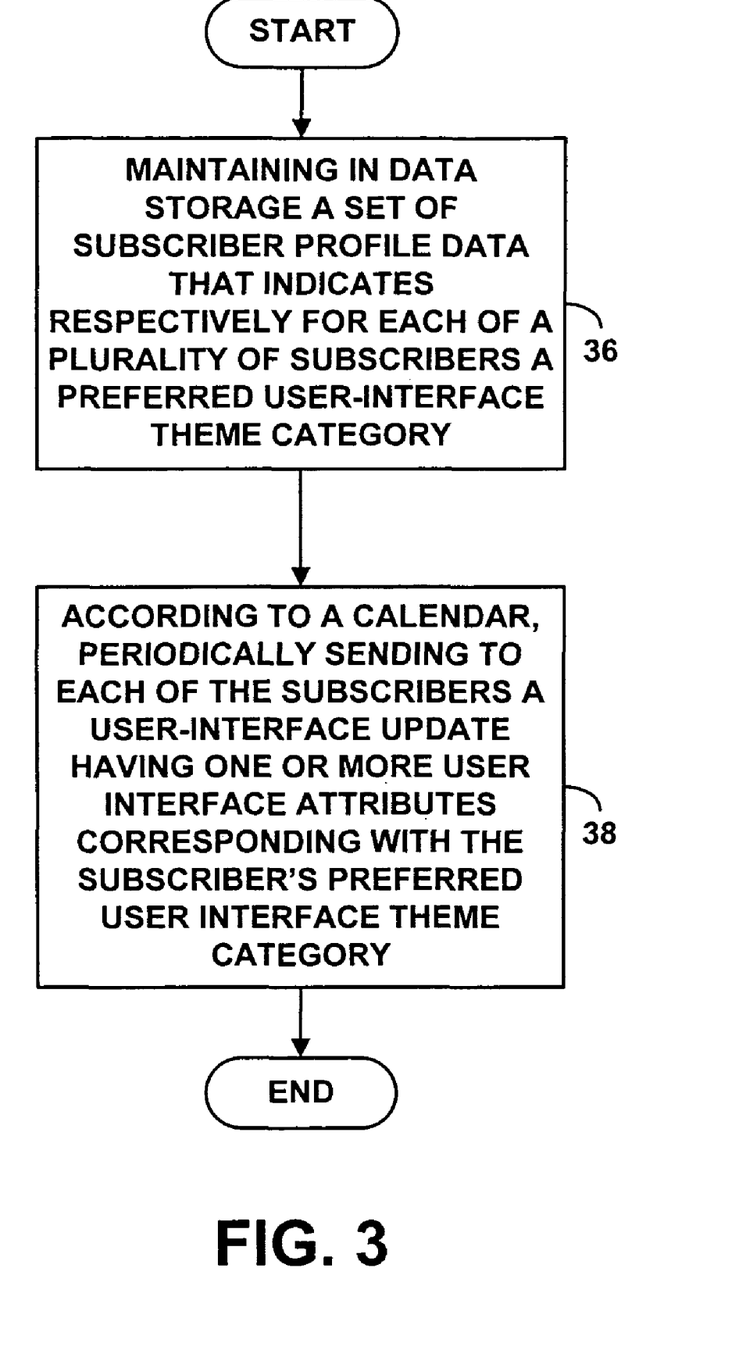
FIG. 3 is another flow chart depicting functions carried out in accordance with the exemplary embodiment.

FIG. 3 is next another flow chart depicting how the exemplary embodiment can operate in the arrangement of FIG. 1. As shown in FIG. 3, at step 36, the method involves maintaining in data storage a set of subscriber profile data that indicates respectively for each of a plurality of subscribers a preferred user-interface theme category. This method step may be accomplished by maintaining subscriber profile data 14 as described above, which, as noted above, can be provisioned by a service provider and/or by users and can be updated at various times.

At step 38, the method next involves, according to a calendar, periodically sending to each of the subscribers a user-interface update having one or more user interface attributes corresponding with the subscriber's preferred user interface theme category. This method step can be carried out in the same manner described by example above.

Figure 4:
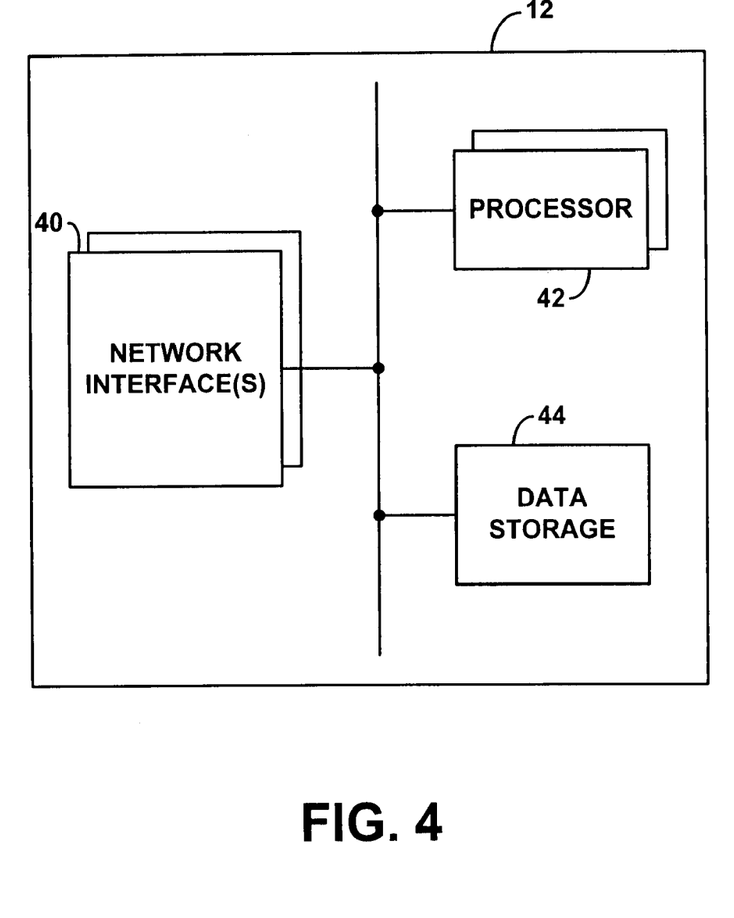
FIG. 4 is a simplified block diagram of a skin server arranged to carry out the exemplary embodiment.

FIG. 4 next provides a block diagram of an exemplary server 12 operable in accordance with the exemplary embodiment. As shown, the exemplary server 12 includes one or more network interfaces 40, a processor 42, and data storage 44, which may be coupled together by a system bus, network, or other mechanism 46.

Network interface 40 functions to provide network connectivity through which an administrator and/or user can provision server 12 with the various data 14, 16, 18 described above. Assuming the provisioning is done over a packet-switched network, a suitable interface would be an Ethernet network interface module. Network interface 40 also functions to provide network connectivity through which server 12 can send skins to subscriber devices, such as devices 20, 22, 24. Assuming the skins are sent over a packet-switched network, a suitable interface for this purpose would also be an Ethernet network interface module. Other sorts of network interfaces, whether wired or wireless, are possible as well.

Processor 42 is one or more processors (e.g., a single processor, or multiple processors working separately or in combination), such as one or more general purpose microprocessors and/or one or more dedicated processing units (such as digital signal processors, for instance). Data storage 44, in turn, holds program instructions and reference data. The program instructions are executable by processor 42 to carry out various functions as described herein. The reference data may include the various data 14, 16, 18 described above, if that data is not maintained external to server 12. Server 12 also includes an internal clock/calendar (not shown), which functions to indicate the current time, day, and date, so as to enable server 12 to detect the occurrence of various calendar events as described above.

Figure 5:
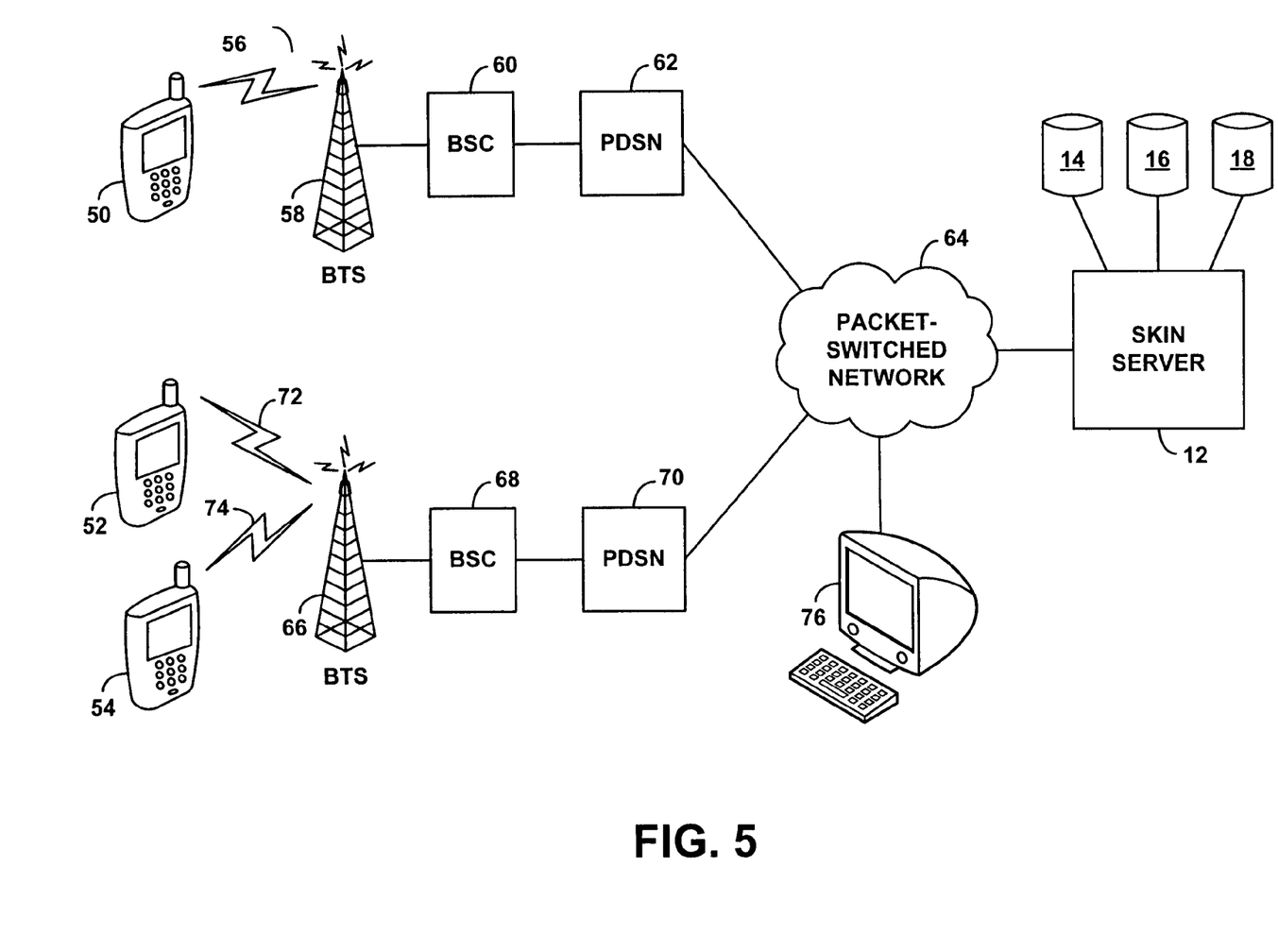
FIG. 5 is a simplified block diagram of a cellular wireless communication system in which the exemplary embodiment can be employed.

FIG. 5 next depicts, as a specific example, a cellular wireless network arrangement in which the exemplary embodiment can be implemented. In FIG. 5, the representative subscriber devices shown are cellular wireless handsets 50, 52, 54, such as cell phones or personal digital assistants. Each of the wireless handsets is arranged to engage in wireless packet-data communication via a respective air interface. Wireless handset 50, for instance, communicates over an air interface 56 with a base transceiver station (BTS) 58, which is coupled with a base station controller (BSC) 60 that is in turn coupled with a packet data serving node (PDSN) 62. PDSN 62 then provides connectivity with a packet-switched network 64 (e.g., a private and/or public network) on which server 12 resides. Wireless handsets 52, 54 each similarly communicate over a respective air interface 72, 74 with a BTS 66, which is coupled with a BSC 68, which is in turn coupled with a PDSN 70. And PDSN 70 similarly provides connectivity with network 64.

The air interfaces may comply with any of a variety of communication protocols, such as CDMA, TDMA, GSM, or others. In a preferred embodiment, the air interfaces comply with the IS-2000 or CDMA2000 protocol. To acquire wireless packet data connectivity, a given wireless handset may send a packet-data origination message over the air interface to a mobile switching center (not shown), which may then signal to the serving BSC. The BSC may then assign an air interface traffic channel over which the handset can communicate, and the BSC may signal to the serving PDSN. The PDSN and handset may then negotiate to establish a data link layer connection, such as a point-to-point protocol (PPP) session for instance, and the PDSN or a mobile-IP home agent (not shown) may then assign an IP address to the handset for use by the handset to engage in packet-data communication on network 64.

With this arrangement, server 12 can send user interface updates to wireless handsets 50, 52, 54 largely in the same manner that server 12 may send user interface updates to any other packet-data terminals. Special procedures may arise for wireless packet-data communication however. For instance, the process of sending a user-interface update to a wireless handset may occur largely in the same manner that other over-the-air provisioning of a wireless handset occurs. In a specific embodiment, the skin server may send user interface updates as WAP PUSH messages, which are largely coded SMS messages to which the recipient device may respond automatically (or with user-approval after prompting) by sending an HTTP GET request to a designated address, in order to download the user interface update. In another specific embodiment, the skin server may send user-interface updates using the Qualcomm technology.

FIG. 5 depicts a provisioning station 76 positioned as a node on packet-switched network 64. Station 76 may be a user's personal computer or an administrator's terminal and may be used to interact with server 12 (e.g., with a web interface provided by server 12) to provision the various data described above.

Provisioning Based on User-Demographics.

This section of this document will now describe a feature whereby the device is provisioned based on user demographics. Such provisioning can include such features as a user interface skin, applications that are loaded onto the device, and/or logic for accessing services offered by a wireless service provider, e.g., email, picture storage, games, media streaming, etc. Such provisioning can occur at the time of purchase or later on when the subscriber profile changes.

Figure 6:
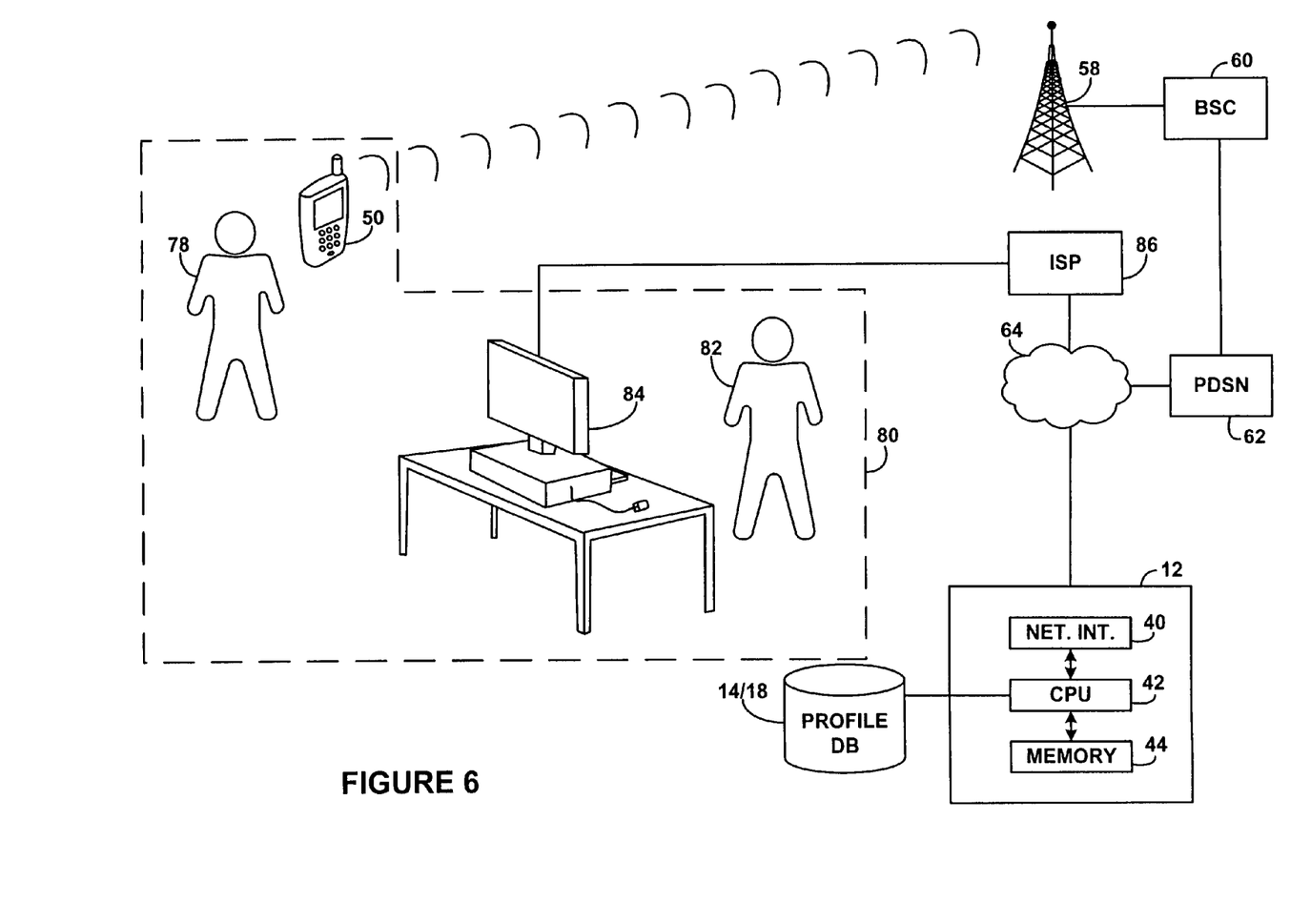

FIG. 6 is an illustration of a subscriber 78 making a purchase of a wireless communications device 50, e.g., cell phone, from a retail store 80. Demographic data is obtained from the subscriber at the time of purchase. Such demographic data could be acquired in any manner, such as for example by the user filling out a questionnaire and the information entered into a computer 84 at the retail store by a clerk 82. The questionnaire could contain demographics-related questions for the purchaser/subscriber 78 to answer. The demographic data is sent in electronic form from the computer 84 over a network connection to an Internet Service Provider 86 which then directs the classification data onto a packet switched network 64 for transmission to a provisioning system 12. Network 64 may be a backbone network of a wireless service provider, e.g., SprintNextel. The provisioning system 12 is typically managed by the wireless service provider. The manner of transmission and acquisition of the demographics data by the provisioning system 12 is not critical. The entire transaction could be conducted over the Internet or the telephone and the demographics information acquired by a human operator or provided by the user in response to prompts.

The provisioning system 12 may take the form of a network server or workstation having a network interface 40 to the network 64, a central processing unit 42 and a memory 44 containing provisioning instructions. Such instructions include a routine for classifying the subscriber 78 in a demographics category based on the demographics data they provided. For example, if the subscriber indicated that they are under the age of 18 and male, the classification algorithm could assign the user as Male Connected Youth. As another example, if the subscriber indicated that they are female and head of a household, then the algorithm could assign the subscriber as Female Head of Household. The details of the particular classification algorithm can be developed by persons skilled in the art, and may vary widely depending on the number of predetermined classifications, whether business professions are included, and other factors.

Figure 7:
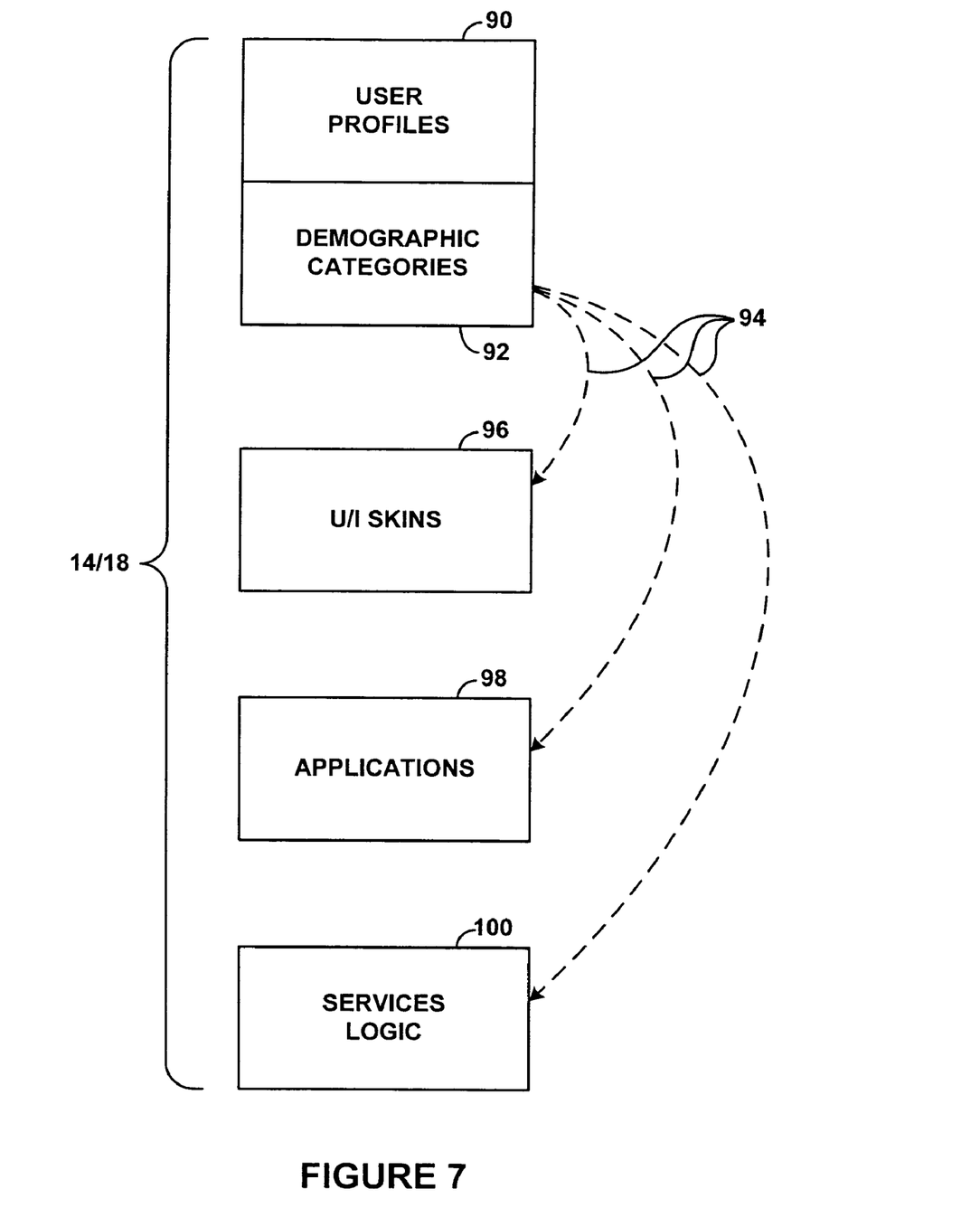
FIG. 7 is an illustration of profile database showing a user profile, demographic categories, and links or pointers for the various categories that point to services, applications and user interface skins that are assigned to each demographic category.

The provisioning system 12 is connected to a profile database 14/18 which contains not only user profile data (including the demographic data and classification assigned to subscribers) but also application logic, services logic and user interface skins logic and settings. One manner in which profile database 14/18 can be implemented is shown in FIG. 7. The database 14/18 includes user profiles 90 for a multitude of subscribers, e.g., as columns or tables of data. It also includes a plurality of fields each for predetermined demographics categories 92 that are established by the provider of wireless services. For example, these categories could include both general categories, such as Connected Youth, Retiree, etc., as will as business categories, such as Banker, Stock Broker, etc. The subscriber is assigned to one of these categories. The demographics categories 92 contain links or pointers 94 to specific fields in other areas of the database, as indicated in FIG. 7. These fields include a user interface skins field 96, applications field 98 and services logic field 100. The user interface skins field 96 contains settings, program logic, and other data which are transmitted to the device 50 in order to configure the user interface of the device to have a particular user interface skin. The applications field 98 contains applications (program code) which provide features on the device 50, such as games, a web browser, an email application, and so forth. The services logic field 100 contains additional code, instructions or settings which enable the device 50 to access specific features or services offered by the wireless service provider.

Accordingly, when a subscriber is assigned a particular demographic category, such category includes a link, pointer, or other feature 94 which associate the subscriber to at least one of the following: a user interface skin in the field 96, one or more applications in the field 98, and services logic in field 100.

After the network server 12 has assigned the subscriber to a particular classification, the provisioning then proceeds based on the demographic category or segment that the subscriber is assigned to. For example, when the user turns on the device 50 for the first time and establishes service with the wireless service provider, and over-the-air provisioning process occurs in which the network server 12 retrieves application code, settings, service logic, and user interface skin data from the database 14/18 and then has it transmitted over the air interface to the device 50, using the wireless infrastructure 62/60/58 shown in FIG. 6.

In one embodiment, the services or applications may be bundled or grouped in a manner that is appropriate for the demographic categories established by the service provider.

From the above discussion, a method of provisioning a user interface of a wireless communications device has been disclosed comprising the steps of acquiring demographic data from a subscriber using the wireless communications device (e.g., as shown and described in FIG. 6); classifying the subscriber into a demographic category based on the acquired demographic data, e.g., using a classification algorithm in the network server 40 of FIG. 6; and then provisioning the device with a graphic user interface (e.g., skin) associated with the demographic category. Such provisioning can occur over an air interface, e.g., during an initializing and initial configuration step when the user establishes service. Such initial provisioning could also be performed at the device the point of sale, such as by transferring files containing provisioning data and settings directly to the device, e.g., using a memory stick, USB connection or other method.

In one embodiment the demographic category for which the subscriber is classified is selected a plurality of predetermined demographic categories, e.g., connected youth, retiree, Female head of family, as explained previously. The method may further comprise the steps of creating a profile for the subscriber (e.g., in the profile database 14/18), and including the demographic category of the subscriber in the profile. The profile may also contain pointers or links which link the subscriber profile to one or more services, applications or user interface skins based on the demographic category assigned by the subscriber, as indicated in FIG. 7.

As noted, the initial provisioning of the wireless device can take a variety forms, such as skins, services and/applications. In one specific embodiment, the provisioning step includes the step of changing the user interface look and feel of an application installed on the device. For example, the application may be modified with settings or parameters which cause the device to display certain graphics, make certain sounds, or other "look and feel" features that are appropriate for the particular demographic segment the subscriber is assigned.

Furthermore, as noted above, the method may also include a step of acquiring new demographic data for the subscriber substantially after the acquisition of the device. For example, the user may access their profile, e.g., via a web provisioning interface, and then upload new demographic data. Optionally, the user could be prompted to determine whether it would like the system to re-classify the subscriber. The provisioning system then re-classifies the subscriber into a new demographic category based on the new demographic data. Then, the provisioning system of FIGS. 6 and 7 re-provisions the device with a new user interface skin based on the new demographic category, and/or provides the device with new services or applications which are appropriate for the new classification.

As noted above, the demographic category for which the subscriber is classified is preferably selected as one of a plurality of predetermined demographic categories. In one embodiment, such categories include demographic categories associated with particular business professions, such as health care worker, claims adjuster, real estate broker, lawyer, etc. Each business profession may be associated with an appropriate bundle of applications and/or services that are pertinent to such categories. The method may further comprise the step of provisioning the device with the bundle of applications and/or logic for implementing the bundle of services.

It will further be appreciated that a system 12 (FIG. 6) has been described for provisioning a wireless communications device with at least one of (a) a user interface skin, (b) application logic, and (c) wireless communication services has been described. This system includes a computing platform 12 having a machine-readable memory 44 and a processor 42 for executing instructions stored in the memory 44, the instructions including instructions for:

(a) acquiring demographic data from a subscriber using the wireless communications device; (b) classifying the subscriber into a demographic category based on the demographic data; (c) selecting at least one of 1) a user interface skin, 2) a set of application logic, 3) a bundle of services for the subscriber for use with the device based on the demographic category, and (d) providing the selected user interface skin, set of application logic and/or logic for enabling use of the wireless communication services to the device.

As shown in the embodiment of FIG. 6, the system 12 further comprises a network interface 40 coupling the computing platform 12 to a packet switched network and wherein the platform is configured to receive demographic data from the location of initial sale of the device.

Representative embodiments of the present invention has been described above. Those skilled in the art will understand, however, that changes and modifications may be made to this embodiment without departing from the true scope and spirit of the present invention, which is defined by the claims.

I claim:

1. A method of provisioning a user interface of a wireless communications device, comprising:
    (a) acquiring demographic data from a subscriber using the wireless communications device;
    (b) classifying the subscriber into a demographic category based on the acquired demographic data, wherein the demographic category for which the subscriber is classified is selected from a plurality of predetermined demographic categories;
    (c) sending to the wireless communications device a user interface skin associated with the demographic category the subscriber was classified in at step (b) and a set of one or more files comprising instructions to configure the device to have the user interface skin;
    (d) creating a profile for the subscriber and including the demographic category the subscriber was classified in at step (b) in the profile,
    (e) linking the subscriber profile to a bundle of wireless communications services of a wireless service provider provided to the subscriber based on the demographic category the subscriber was classified in at step (b) and providing application logic to the wireless communications device to access the one or more of the services in the bundle of wireless communications services,
    wherein the acquisition and classification steps are performed at the time of the subscriber's acquisition of the wireless communications device,
    (f) acquiring new demographic data for the subscriber after the acquisition of the wireless communications device;
    (g) re-classifying the subscriber into a new demographic category; and
    (h) re-provisioning the wireless communications device with a new user interface skin based on the new demographic category.

2. The method of claim 1, wherein the sending step includes the step of transmitting logic or settings to the wireless communications device changing the user interface look and feel of an application installed on the wireless communications device.

3. The method of claim 1, wherein said categories comprise demographic categories associated with particular business professions.

4. The method of claim 3, wherein each business profession is associated with a bundle of applications and/or wireless communication services for the wireless communications device, and wherein the method further comprises the step of provisioning the wireless communications device with the bundle of applications and/or logic for implementing the wireless communication services.

5. A method of providing services to a subscriber for use with a wireless communications device used by the subscriber, comprising the steps of:
 (a) acquiring demographic data from a subscriber using the wireless communications device;
 (b) classifying the subscriber into a demographic category based on the acquired demographic data;
 (c) selecting a bundle of applications and wireless communications services for the subscriber for use with the wireless communications device based on the demographic category the subscriber was classified in step (b), and
 (d) providing application logic to the wireless communications device for enabling use of the services;
 wherein steps a)-c) are performed at the time of acquisition of the device, and wherein the method further comprises the steps of: e) acquiring new demographic data for the subscriber after the acquisition of the wireless communications device; f) re-classifying the subscriber into a new demographic category; and g) selecting a new bundle of applications and wireless communications service(s) for the subscriber for use with the wireless communications device based on the new demographic category, wherein one of the new bundle of applications and wireless communications service(s) includes a user interface skin.

6. The method of claim 5, wherein the acquisition step a) includes a step of querying the subscriber at the time of acquisition of the wireless communications device.

7. The method of claim 5, wherein the demographic category for which the subscriber is classified is selected from a plurality of predetermined demographic categories, and wherein the demographic categories comprise demographic categories associated with particular business professions.

8. The method of claim 7, wherein each business profession is associated with a bundle of applications and wireless communication services for the wireless communications device, and wherein the method further comprises the step of provisioning the wireless communications device with logic for implementing the bundle of applications and wireless communication services.

9. A system for provisioning a wireless communications device with (a) a user interface skin, (b) application logic, and (c) wireless communication services, comprising:
 a computing platform having a machine-readable memory and a processor for executing instructions stored in the memory, the instructions including instructions for:
 (a) acquiring demographic data from a subscriber using the wireless communications device;
 (b) classifying the subscriber into a demographic category based on the demographic data;
 (c) selecting 1) a user interface skin, 2) a set of application logic, and 3) a bundle of wireless communications services for the subscriber for use with the wireless communications device based on the demographic category,
 (d) providing the selected user interface skin, set of application logic and logic for enabling use of the bundle of wireless communication services by the wireless communications device,
 wherein the acquisition and classification steps are performed at the time of the subscriber's acquisition of the wireless communications device, and where the instructions are further executable by the processor for:
 (e) acquiring new demographic data for the subscriber after the acquisition of the wireless communications device;
 (f) re-classifying the subscriber into a new demographic category; and
 (g) re-provisioning the wireless communications device with a new user interface skin based on the new demographic category.

10. The system of claim 9, wherein the system further comprises a network interface coupling the computing platform to a packet switched network and wherein the platform is configured to receive demographic data at the time of sale of the wireless communications device.

11. The system of claim 9, wherein the demographic category for which the subscriber is classified is selected from a plurality of predetermined demographic categories, and wherein the demographic categories comprise demographic categories associated with particular business professions.

12. The system of claim 11, wherein each business profession is associated with a bundle of wireless communication services for the device, and wherein the method further comprises the step of provisioning the wireless communications device with logic for implementing the bundle of wireless communication services.

* * * * *